(12) United States Patent
Yasue et al.

(10) Patent No.: US 9,150,151 B2
(45) Date of Patent: Oct. 6, 2015

(54) VEHICLE INDICATOR ILLUMINATION CIRCUIT AND METHOD FOR CONTROLLING VEHICLE INDICATOR ILLUMINATION CIRCUIT

(75) Inventors: Yoshifumi Yasue, Aichi (JP); Hiroshi Nakano, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 454 days.

(21) Appl. No.: 13/611,724

(22) Filed: Sep. 12, 2012

(65) Prior Publication Data

US 2013/0069528 A1    Mar. 21, 2013

(30) Foreign Application Priority Data

Sep. 15, 2011  (JP) ................................. 2011-202128
Nov. 15, 2011  (JP) ................................. 2011-249996

(51) Int. Cl.
*B60Q 1/14* (2006.01)
*B60Q 3/04* (2006.01)
*B60R 16/023* (2006.01)
*H05B 37/02* (2006.01)

(52) U.S. Cl.
CPC ............ *B60Q 3/046* (2013.01); *B60R 16/0232* (2013.01); *H05B 37/02* (2013.01)

(58) Field of Classification Search
CPC .......................... B60R 16/03; B60R 16/0232
USPC .............................. 315/77, 79; 307/10.1, 10.8
See application file for complete search history.

(56) References Cited

U.S. PATENT DOCUMENTS

| 6,140,622 | A  | * | 10/2000 | Goings et al. ................. 219/506 |
| 6,995,524 | B2 | * | 2/2006  | Takahashi ..................... 315/307 |
| 2004/0195980 | A1 | | 10/2004 | Takahashi |
| 2006/0055244 | A1 | | 3/2006  | Ito et al. |
| 2009/0072764 | A1 | | 3/2009  | Kitagawa et al. |
| 2009/0129111 | A1 | | 5/2009  | Ito et al. |

FOREIGN PATENT DOCUMENTS

| CN | 1535864    | 10/2004 |
| CN | 1744789    | 3/2006  |
| CN | 101357609  | 2/2009  |
| JP | 2004-325324 | 11/2004 |

OTHER PUBLICATIONS

China Office action, mail date is Jun. 4, 2014.

\* cited by examiner

*Primary Examiner* — Minh D A
*Assistant Examiner* — Borna Alaeddini
(74) *Attorney, Agent, or Firm* — Greenblum & Bernstein P.L.C.

(57) ABSTRACT

A power supply route for a light source includes a first route that closes when a microcomputer is operated and a second route that opens when the microcomputer is operated. When the microcomputer stops operating, the power supply route of the light source is automatically switched from the first route to the second route. When the microcomputer is operated and a position lamp switch is turned on, current is supplied to the light source through the first route. When the microcomputer stops operating and the position lamp switch is turned on, current is supplied to the light source through the second route.

15 Claims, 6 Drawing Sheets

VEHICLE INDICATOR ILLUMINATION CIRCUIT AND METHOD FOR CONTROLLING VEHICLE INDICATOR ILLUMINATION CIRCUIT

CROSS-REFERENCE TO RELATED APPLICATIONS

This application is based upon and claims the benefit of priority from prior Japanese Patent Application No. 2011-202128, filed on Sep. 15, 2011 and prior Japanese Patent Application No. 2011-249996, filed on Nov. 15, 2011, the entire contents of which are incorporated herein by reference.

BACKGROUND OF THE INVENTION

The present invention relates to an illumination circuit, which controls the illumination of an indicator provided in a vehicle interior, and a method for controlling an illumination circuit.

A vehicle includes an indicator, which indicates the vehicle state or an abnormality, and an illumination circuit, which controls the illumination of the indicator. Japanese Laid-Open Patent Publication No. 2004-325324 describes an example of such an illumination circuit. As shown in FIG. 7, an illumination circuit includes a micro-processing unit (MPU) 71, a transistor 72, and an indicator 73. The MPU 71 activates or deactivates the transistor 72 to control the illumination of the indicator 73. The indicator 73 includes a mark 74, which indicates the content of a warning, and a light emitting diode 75. When the transistor 72 is activated, the light emitting diode 75 is lit to illuminate the mark 74. The MPU 71 provides the transistor 72 with a pulse width modulation (PWM) signal based on illumination information or darkening information of the indicator 73, which is obtained by a sensor, to perform pulse width modulation (PWM) control on the light emitting diode 75. When the MPU 71 illuminates or darkens the light emitting diode 75, the MPU 71 changes the duty ratio of the pulse width modulation (PWM) signal to gradually change the brightness of the light emitting diode 75. In this manner, the illumination control generates a fade-in effect, which gradually brightens the light emitting diode 75, or a fade-out effect, which gradually darkens the light emitting diode 75.

In the illumination circuit of Japanese Laid-Open Patent Publication No. 2004-325324, when an ignition switch deactivates the power supply of the vehicle, the MPU 71 stops operating. Thus, the indicator 73 cannot be illuminated. However, it has become desirable that the indicator 73 be illuminate even when the MPU 71 stops operating.

One aspect of the present invention is a vehicle indicator illumination circuit including an indicator that indicates a vehicle state or abnormality. A control circuit is operated by an ignition power supply. The control circuit controls power that is supplied to the indicator. A power supply route extends to the indicator. The power supply route includes a first route that closes when the control circuit operates and a second route that opens when the control circuit operates. When the control circuit stops operating, the first route opens and the second route closes, and the power supply route extending to the indicator is automatically switched from the first route to the second route.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

A vehicle indicator illumination circuit according to a first embodiment of the present invention will now be described with reference to FIGS. 1 to 3.

The vehicle indicator illumination circuit of the first embodiment includes an indicator, a control circuit, and a power supply route. The indicator indicates the vehicle state or an abnormality. The control circuit is powered by an ignition power supply and controls the supply of power to the indicator. The power supply route to the indicator includes a first route, which closes when the control circuit operates, and a second route, which opens when the control circuit operates. When the control circuit stops operating, the first route opens and the second route closes. This automatically switches the power supply route to the indicator from the first route to the second route.

Figure 1:
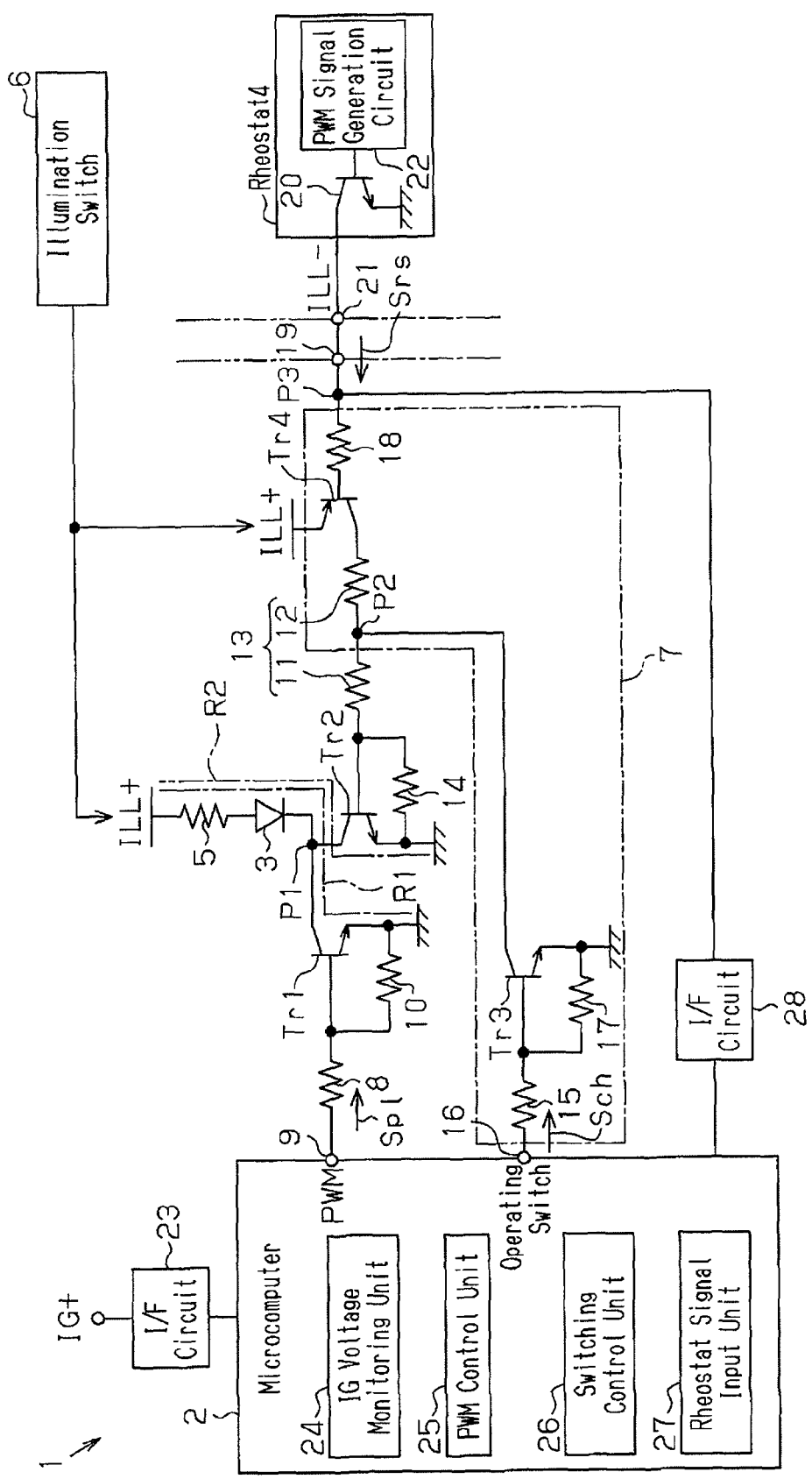
FIG. 1 is an electric diagram of a vehicle indicator illumination circuit according to a first embodiment of the present invention.

As shown in FIG. 1, a vehicle includes a vehicle indicator illumination circuit 1, which illuminates various instruments of the vehicle. The vehicle indicator illumination circuit 1 illuminates, for example, a manual control device, a telltale, an indicator, and the like in the vehicle so that they can be recognized. The vehicle indicator illumination circuit 1 includes a microcomputer 2, which controls illumination by the vehicle indicator illumination circuit 1, a light source 3, which emits illumination light, and a rheostat 4. The microcomputer 2 corresponds to a control circuit. An example of the light source 3 is a light emitting diode (LED). In this case, a first terminal of the light source is an anode, and a second terminal of the light source is a cathode.

When a vehicle power supply (ignition switch) is located at an on position and the microcomputer 2 is thus operating, the microcomputer 2 performs pulse width modulation (PWM) to control the illumination or darkening of the light source 3. In the PWM control, the duty ratio of a PWM signal Sp1 output from the microcomputer 2 is changed to set the brightness of the light source 3. IN this manner, the brightness of the light source 3 is set based on the duty ratio of the PWM signal Sp1. The duty ratio of the PWM signal Sp1 is the ratio of an H-level period and an L-level period in a single signal cycle. Examples of the on position of the ignition switch are an ignition on position (IG) and a starter on (ST) position. The PWM signal Sp1 corresponds to a control signal.

When the ignition switch is located at an off position and the microcomputer 2 thus stops operating, the vehicle indicator illumination circuit 1 directly controls the rheostat 4 to illuminate or darken the light source 3. Accordingly, even when the microcomputer 2 stops operating, the light source 3 can be lit by the direct control of the rheostat 4 (hereinafter simply referred to as direct control). In the direct control, the rheostat 4 generates a pulsed rheostat signal Srs, and illumination of the light source 3 is controlled based on the rheostat signal Srs. Examples of the off position of the ignition switch are an IG off position. The rheostat 4 corresponds to a signal generation circuit, and the rheostat signal Srs corresponds to an external pulse signal.

The vehicle includes an illumination switch 6 that supplies a first terminal of the light source 3 with positive illumination voltage ILL+ via a voltage regulation resistor 5 from an in-vehicle battery. The positive illumination voltage ILL+ is supplied from the in-vehicle battery to the light source 3 in accordance with an on/off operation of the illumination switch 6. Specifically, when the illumination switch 6 is turned on, the positive illumination voltage ILL+ is supplied from the in-vehicle battery to the light source 3. Conversely, when the illumination switch 6 is turned off, the positive illumination voltage ILL+ is not supplied from the in-vehicle battery to the light source 3. An example of the illumination switch 6 is a position lamp switch operated when illuminating or darkening the headlights of the vehicle.

The vehicle indicator illumination circuit 1 includes a first transistor Tr1, a second transistor Tr2, and a connection switching circuit 7 that activates or deactivates the second transistor Tr2. The first transistor Tr1 is activated during illumination control (hereinafter referred to as computer control) of the light source 3 by the microcomputer 2. The second transistor Tr2 is activated during direct control of the rheostat 4. Also, the connection switching circuit 7 includes a third transistor Tr3, which switches between the computer control and the direct control, and a fourth transistor Tr4, which is activated or deactivated by the rheostat signal Srs during the direct control. The first transistor Tr1 corresponds to a first switch unit or a first switching element, and the second transistor Tr2 corresponds to a second switch unit or a second switching element. Also, the third transistor Tr3 corresponds to a fourth switching element, and the fourth transistor Tr4 corresponds to a third switching element.

The first transistor Tr1 is formed by an NPN-type bipolar transistor, for example. The first transistor Tr1 includes a collector terminal connected to the second terminal of the light source 3, an emitter terminal connected to ground, and a base terminal connected to a PWM control terminal 9 of the microcomputer 2 via a resistor 8. Between the base and the emitter of the first transistor Tr1, a resistor 10 is connected to determine the voltage between the base and the emitter. A current route that extends through the light source 3 and the first transistor Tr1 is referred to as a first route R1.

The second transistor Tr2 is formed by an NPN-type bipolar transistor, for example. The second transistor Tr2 includes a collector terminal connected to a connection node P1 between the light source 3 and the first transistor Tr1, an emitter terminal connected to ground, and a base terminal connected to a collector terminal of the fourth transistor Tr4 via a series circuit 13 of two resistors 11 and 12. Between the base and the emitter of the second transistor Tr2, a resistor 14 is connected to determine the voltage between the base and the emitter. A current route that extends through the light source 3 and the second transistor Tr2 is referred to as a second route R2.

The third transistor Tr3 is formed by an NPN-type bipolar transistor, for example. The third transistor Tr3 includes a collector terminal connected to a connection node P2 between the resistor 11 and the resistor 12, an emitter terminal connected to ground, and a base terminal connected to an operation switching terminal 16 of the microcomputer 2 via a resistor 15. The collector terminal of the third transistor Tr3 is connected to the connection node P2 between the resistor 11 and the resistor 12. Between the base and the emitter of the third transistor Tr3, a resistor 17 is connected to determine the voltage between the base and the emitter.

The fourth transistor Tr4 is formed by a PNP-type bipolar transistor, for example. The fourth transistor Tr4 includes an emitter terminal, which is connected to the illumination voltage ILL+, and a base terminal, which is connected to a rheostat connection terminal 19 of the vehicle indicator illumination circuit 1 via a resistor 18.

The rheostat 4 includes a rheostat transistor 20 that generates the rheostat signal Srs and a PWM signal generation circuit 22. The rheostat transistor 20 is formed by an NPN-type bipolar transistor, for example. The rheostat transistor 20 includes a collector terminal connected to a rheostat signal output terminal 21, an emitter terminal connected to ground, and a base terminal connected to the PWM signal generation circuit 22. This configuration supplies the rheostat signal output terminal 21 with negative-voltage illumination voltage ILL−.

The PWM signal generation circuit 22 generates a pulse signal having a duty ratio that is in accordance with an operation amount of a rheostat switch (not shown) and provides the pulse signal to the base terminal of the rheostat transistor 20 to activate or deactivate the rheostat transistor 20. In response, the rheostat 4 supplies a pulsed rheostat signal Srs having a pulse width in accordance with the duty ratio of the pulse signal to the base terminal of the fourth transistor Tr4 via the rheostat signal output terminal 21 and the rheostat connection terminal 19. Thus, the fourth transistor Tr4 is activated or deactivated based on the PWM control of the rheostat 4. The rheostat 4 is supplied with power from the in-vehicle battery regardless of the position of the ignition switch and constantly outputs the rheostat signal Srs.

The microcomputer 2 is supplied with ignition voltage IG+ via an I/F circuit 23. When the ignition switch is located at the on position, the ignition voltage IG+ is supplied from the in-vehicle battery to the microcomputer 2. As a result, the microcomputer 2 becomes operable. The ignition voltage IG+ corresponds to an ignition power supply.

The microcomputer 2 includes an ignition voltage monitoring unit 24 that monitors the ignition voltage IG+. The ignition voltage monitoring unit 24 sequentially monitors the value of the ignition voltage IG+ during the operation of the microcomputer 2.

The microcomputer 2 includes a PWM control unit 25 that performs PWM control when operated to activate or deactivate the first transistor Tr1 and illuminate the light source 3. The PWM control unit 25 supplies the PWM signal Sp1 from the PWM control terminal 9 to the base terminal of the first transistor Tr1 to switch between activation and deactivation of the first transistor Tr1 at high speeds. As a result, current intermittently flows in the first route R1 and allows the light source 3 to be illuminated with the desired brightness. In this manner, the light source 3 is illuminated when the first transistor Tr1 is activated and darkened when the first transistor Tr1 is deactivated. The illumination and darkening of the light source 3 are switched at high speeds, and the light source 3 appears as if it is intermittently illuminated. Further, the brightness of the light source 3 is determined in accordance with the duty ratio of the PWM signal Sp1. The brightness of the light source 3 increases when the duty ratio of the PWM signal Sp1 increases. The brightness of the light source 3 decreases when the duty ratio of the PWM signal Sp1 decreases.

The microcomputer 2 includes a switching control unit 26 that switches the illumination control of the light source 3 between the computer control and the direct control. The switching control unit 26 generates a switching request signal Sch and outputs the switching request signal Sch from the operation switching terminal 16. The switching control unit 26 generates an H-level switching request signal Sch during operation of the microcomputer 2. This activates the third transistor Tr3, and current Ia sequentially flows to the fourth transistor Tr4, the resistor 12, the third transistor Tr3, and the ground as shown in FIG. 2. Thus, when the fourth transistor Tr4 is provided with the rheostat signal Srs, the connection switching circuit 7 can supply an L-level signal to the base of the second transistor Tr2 to deactivate the second transistor Tr2. Accordingly, when the microcomputer 2 is operating, the first transistor Tr1 is activated, and the second transistor Tr2 is deactivated.

When the microcomputer 2 is not operating, the ignition voltage IG+ is not supplied to the microcomputer 2, and the switching control unit 26 generates an L-level switching request signal Sch. This deactivates the third transistor Tr3, and current Ib flows in the fourth transistor Tr4, the resistor 11, and the resistor 14 in this order as shown in FIG. 3. The connection switching circuit 7 can activate or deactivate the second transistor Tr2 via the fourth transistor Tr4 in accordance with the rheostat signal Srs. Accordingly, when the microcomputer 2 is not operating, the first transistor Tr1 is deactivated, and the second transistor Tr2 is activated.

When the voltage of the in-vehicle battery (illumination voltage ILL+, ignition voltage IG+) fluctuates, the PWM control unit 25 adjusts the duty ratio of the PWM signal Sp1 in accordance with the fluctuation in the voltage of the in-vehicle battery so that the light source 3 can be illuminated with a predetermined brightness. Specifically, the PWM control unit 25 monitors the difference of the voltage monitored by the ignition voltage monitoring unit 24 and a target voltage and adjusts the duty ratio of the PWM signal Sp1 in accordance with the difference. In this manner, the PWM control unit 25 controls the light source 3 so that the brightness is constant.

The PWM control unit 25 sets the brightness of the light source 3 in accordance with the operation amount set by the rheostat 4. More specifically, the microcomputer 2 includes a rheostat signal input unit 27 that obtains the rheostat signal Srs from the rheostat 4. The rheostat signal input unit 27 is connected via an I/F circuit 28 to a connection node P3 between the resistor 18 and the rheostat connection terminal 19. The rheostat signal input unit 27 is provided with the rheostat signal Srs via the I/F circuit 28. The PWM control unit 25 controls the duty ratio of the PWM signal Sp1 in accordance with the duty ratio of the rheostat signal Srs. This illuminates the light source 3 with the brightness set by the rheostat 4. The rheostat signal input unit 27 corresponds to an input circuit.

The operation of the vehicle indicator illumination circuit 1 in the first embodiment will now be described with reference to FIGS. 2 and 3.

Figure 2:
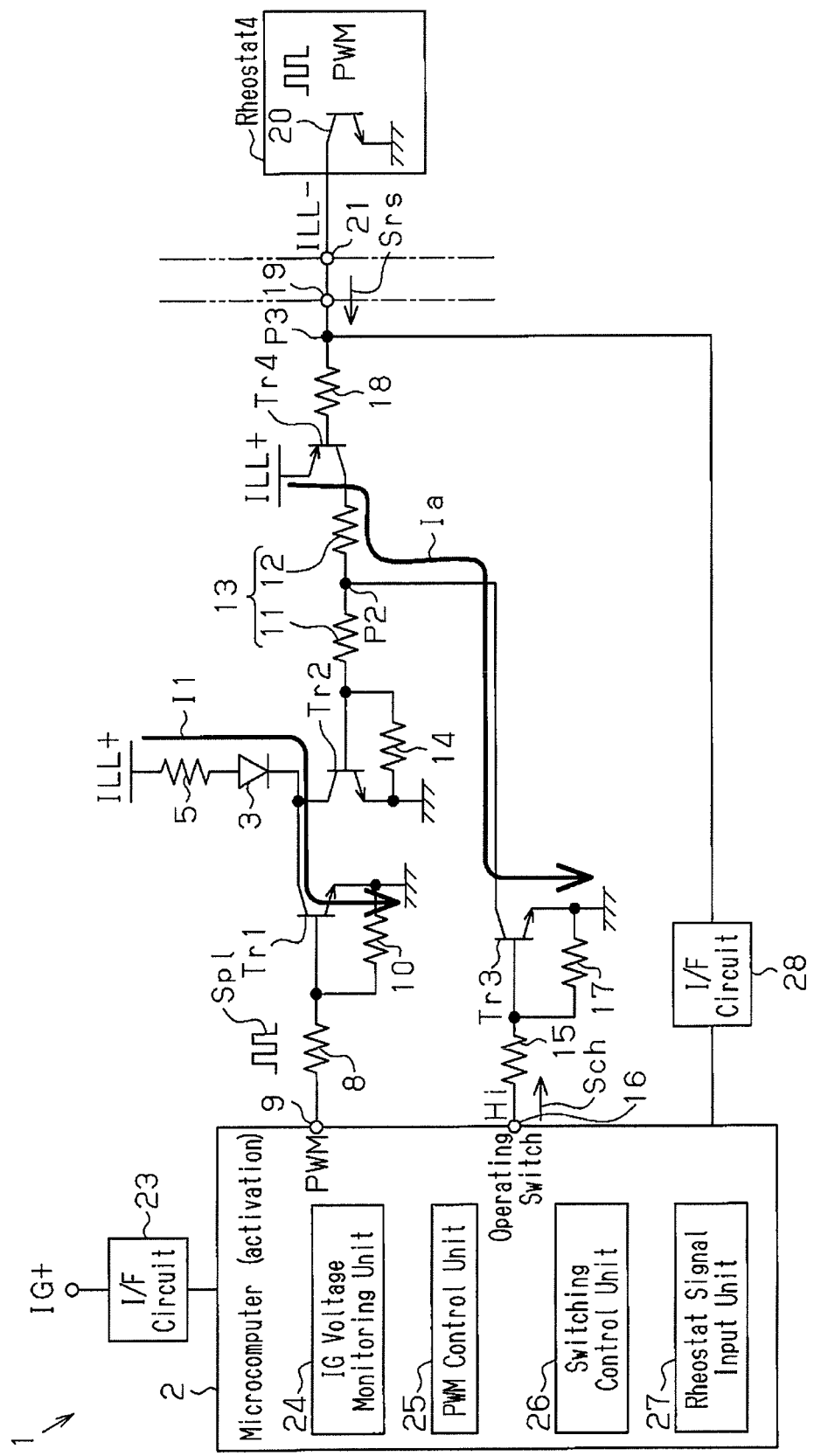
FIG. 2 is an electric diagram illustrating an operation state of the vehicle indicator illumination circuit during PWM control.

First, as shown in FIG. 2, when the ignition switch is switched from the off position to the on position, the microcomputer 2 is supplied with the ignition voltage IG+ and activated. Here, the PWM control unit 25 starts supplying the PWM signal Sp1 from the PWM control terminal 9. Further, the switching control unit 26 starts supplying an H-level switching request signal Sch from the operation switching terminal 16. As a result, the third transistor Tr3 is activated, and the connection switching circuit 7 deactivates the second transistor Tr2. The illumination switch 6 is still off, and the illumination voltage ILL+ is not supplied. Accordingly, the light source 3 remains dark.

When the microcomputer 2 is operated and the illumination switch 6 is turned on, the illumination voltage ILL+ is supplied to the collector terminal of the first transistor Tr1 and the emitter terminal of the fourth transistor Tr4. The base terminal of the fourth transistor Tr4 is provided with the pulsed rheostat signal Srs from the rheostat 4.

In the fourth transistor Tr4, current flows in accordance with the pulse generation timing of the rheostat signal Srs. This activates the third transistor Tr3 and, as shown in FIG. 2, current Ia flows from the fourth transistor Tr4 to the third transistor Tr3. No current is supplied to the base terminal of the second transistor Tr2. That is, the first transistor Tr1 is activated, and the second transistor Tr2 is deactivated.

When the microcomputer 2 is operated and the illumination voltage ILL+ is supplied, the light source 3 is illuminated or darkened by the PWM control of the microcomputer 2. Since the second transistor Tr2 is deactivated, current I1 flows through the first route R1 as shown in FIG. 2 whenever the H-level PWM signal Sp1 is generated. That is, the current I1 flows intermittently through the first route R1 in accordance with the activation or deactivation of the first transistor Tr1. Accordingly, the light source 3 is illuminated with a brightness that is in accordance with the duty ratio of the PWM signal Sp1.

Further, the PWM control unit 25 adjusts the duty ratio of the PWM signal Sp1 in accordance with fluctuations in the voltage of the in-vehicle battery to control the brightness of the light source 3 to be constant during PWM control. In this manner, even when the ignition voltage IG+ and the illumination voltage ILL+ vary due to a fluctuation in the voltage of the in-vehicle battery, the duty ratio of the PWM signal Sp1 is adjusted so that the brightness of the light source 3 is constant. Also, the PWM control unit 25 obtains the rheostat signal Srs from the rheostat 4 and adjusts the duty ratio of the PWM signal Sp1 based on the rheostat signal Srs. Thus, the brightness of the light source 3 is set based on the operation amount of the rheostat 4.

Figure 3:
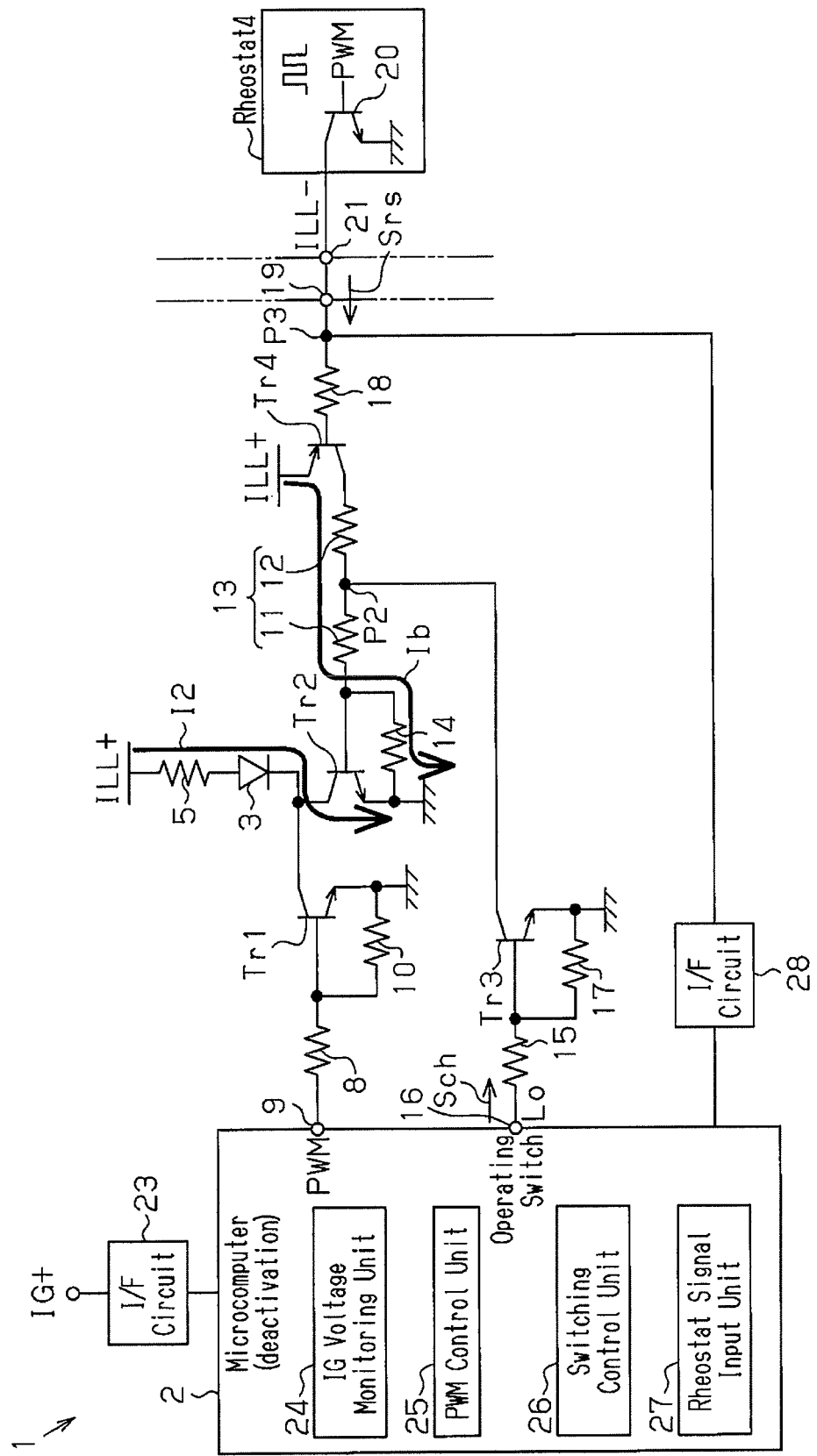
FIG. 3 is an electric diagram illustrating an operation state of the vehicle indicator illumination circuit in direct control.

Subsequently, as shown in FIG. 3, when the ignition switch is switched from the on position to the off position and the illumination switch 6 is turned on, the microcomputer 2 is no longer supplied with the ignition voltage IG+ and stops operating. Thus, the PWM control unit 25 is deactivated, and the microcomputer 2 cannot perform PWM control. Further, the switching control unit 26 cannot be operated, and an L-level switching request signal Sch is provided from the operation switching terminal 16. Thus, the third transistor Tr3 is deactivated, and the connection switching circuit 7 is set to activate the second transistor Tr2.

When the microcomputer 2 stops operating and the illumination voltage ILL+ is supplied, current flows in the fourth transistor Tr4 whenever an H-level rheostat signal Srs is generated. Since the third transistor Tr3 is deactivated, current Ib flows from the fourth transistor Tr4 via the resistor 12, the resistor 11, and the resistor 14 to ground as shown in FIG. 3. In this case, current Ib does not flow to the third transistor Tr3. Thus, the first transistor Tr1 is deactivated, and the second transistor Tr2 is activated.

When the microcomputer 2 stops operating and the illumination voltage ILL+ is supplied, the light source 3 is illuminated or darkened by the direct control of the rheostat signal Srs (PWM control by the rheostat 4). In this case, the fourth transistor Tr4 is activated, and current Ib flows whenever the H-level rheostat signal Srs is generated. This activates the second transistor Tr2. Whenever the second transistor Tr2 is activated, current I2 intermittently flows through the second route R2 as shown in FIG. 3. Accordingly, the light source 3 is illuminated with a brightness that is in accordance with the duty ratio of the rheostat signal Srs.

When the illumination voltage ILL+ is supplied and the ignition switch is switched again from the off position to the on position, the illumination control of the light source 3 is returned from the direct control to the computer control. Here, the PWM control unit 25 resumes the output of the PWM signal Sp1 and starts the computer control. Also, the switching control unit 26 generates an H-level switching request signal Sch and activates the third transistor Tr3 again.

The first embodiment has the advantages described below.

(1) A power supply route of the light source 3 includes the first route R1, through which the current I1 flows, and the second route R2, through which the current I2 flows. When the microcomputer 2 is operated and the ignition switch is located at the on position, the current I1 flows to the light source 3 through the first route R1. When the microcomputer 2 stops operating and the ignition switch is located at the on position, the current I2 flows to the light source 3 through the second route R2. Thus, even when the microcomputer 2 stops operating, the current I2 flows to the light source 3 through the second route R2 so that the light source 3 can be illuminated when the ignition switch is located at the on position.

(2) When the operation of the microcomputer 2 is resumed, the power supply route of the light source 3 is automatically returned from the second route R2 to the first route R1. In this case, the microcomputer 2 performs PWM control again to illuminate the light source 3.

(3) The first to fourth transistors Tr1 to Tr4 are activated or deactivated in accordance with whether or not the microcomputer 2 is operated. That is, when the microcomputer 2 stops operating or resumes operation, activation and deactivation of the first to fourth transistors Tr1 to Tr4 are switched. Thus, the power supply route to the light source 3 can be easily switched between the first route R1 and the second route R2.

(4) When the power supply route to the light source 3 is switched from the first route R1 to the second route R2, the rheostat signal Srs of the rheostat 4 is used to adjust the brightness of the light source 3. This can control the supply of power to the light source 3. The rheostat 4 is operated by power constantly supplied from the power supply. Thus, when the microcomputer 2 stops operating, the rheostat 4 continues to operation. This allows for the illumination of the light source 3 to be adjusted in accordance with the duty ratio of the rheostat signal Srs.

(5) Power is supplied to the light source 3 when the ignition switch is located at the on position. Thus, the light source 3 is illuminated only when necessary.

(6) When the ignition switch is located at the off position, the rheostat 4 can control the brightness of the light source 3 in accordance with the duty ratio of the rheostat signal Srs (PWM output). Also, when the ignition switch is located at the on position, the microcomputer 2 can regulate the duty ratio of the PWM signal Sp1 in accordance with the duty ratio of the rheostat signal Srs to control the brightness of the light source 3. Thus, when the duty ratio of the PWM signal Sp1 is equal to the duty ratio of the rheostat signal Srs, the brightness of the light source 3 is constant regardless of the position of the ignition switch. The brightness of the light source 3 is set based on the duty ratio of the rheostat signal Srs regardless of the position of the ignition switch, that is, regardless of the operation of the microcomputer 2. The duty ratio of the PWM signal Sp1 may differ from the duty ratio of the rheostat signal Srs.

Figure 4:
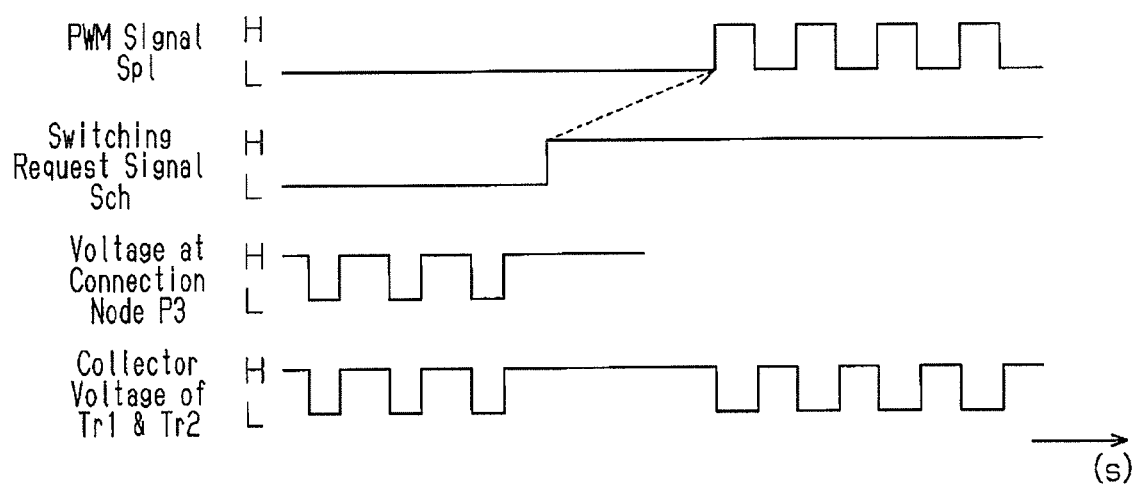
FIG. 4 is a timing chart when output timing of a PWM signal and output timing of a switching request signal do not match.

In the first embodiment, in a state in which the illumination switch 6 is turned on, when the ignition switch is switched from the on position to the off position, and the illumination control for the light source 3 is switched from the direct control to the PWM control (computer control), the rising timing of the PWM signal Sp1 may be shifted from the rising timing of the switching request signal Sch, as shown in FIG. 4. When the rising timing of the PWM signal Sp1 is later than the rising timing of the switching request signal Sch as shown in FIG. 4, a period in which the light source 3 momentarily darkens is generated. Also, when the rising timing of the PWM signal Sp1 is advanced from the rising timing of the switching request signal Sch (not shown), interference occurs between the PWM driving. This flickers the illumination.

In a second embodiment, a microcomputer 2a in a vehicle indicator illumination circuit 1a controls the rising timing of the PWM signal Sp1 and the rising timing of the switching request signal Sch.

Differences from the first embodiment will mainly be described. Like or same reference numerals are given to those components that are the same as the corresponding components shown in FIGS. 1 to 4. Such components will not be described.

Figure 5:
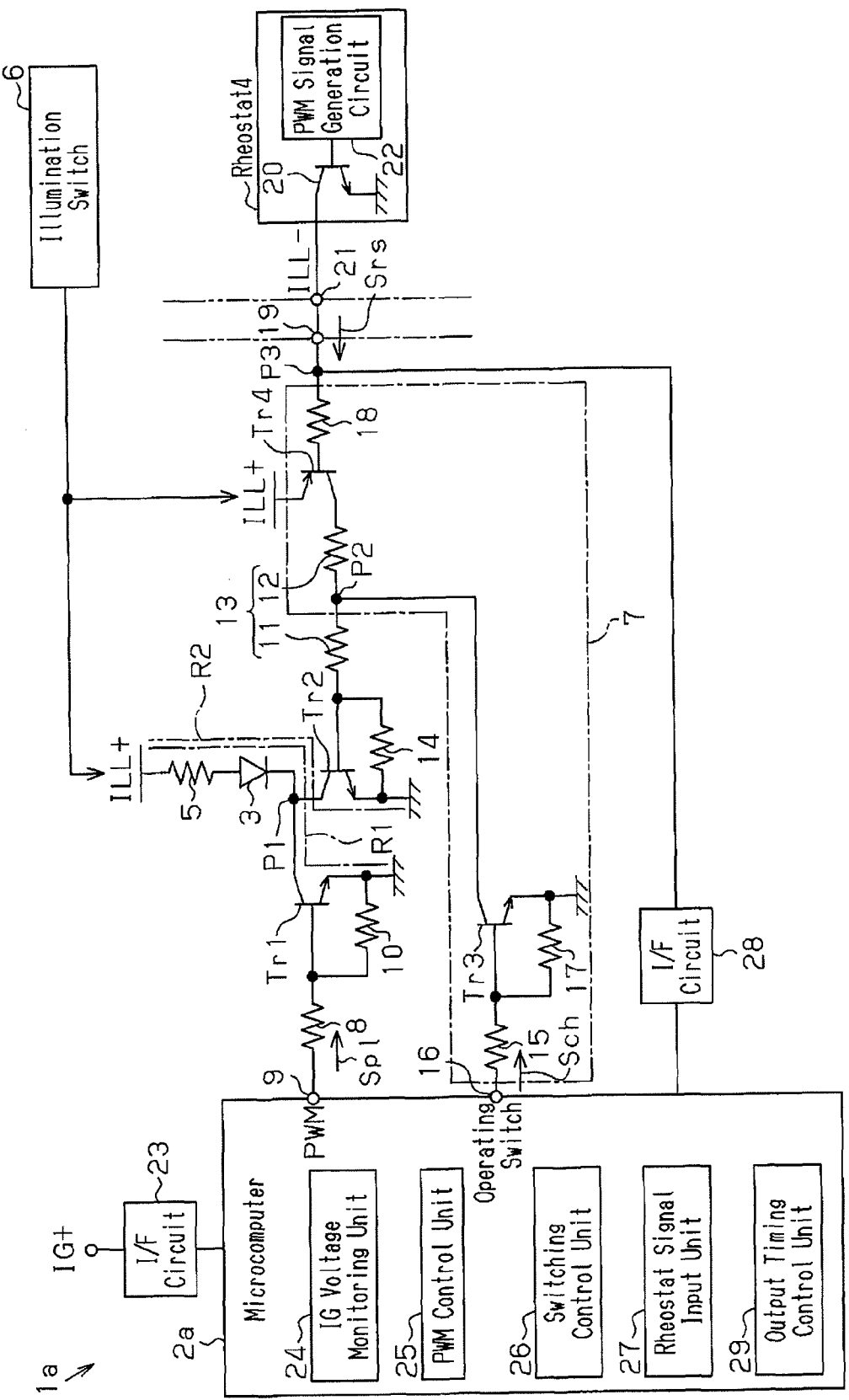
FIG. 5 is an electric diagram of a vehicle indicator illumination circuit according to a second embodiment of the present invention.

As shown in FIG. 5, the microcomputer 2a includes an output timing control unit 29 that controls the rising timing of the PWM signal Sp1 and the rising timing of the switching request signal Sch. The output timing control unit 29 synchronizes the PWM signal Sp1 with the switching request signal Sch in the computer control. That is, the output timing control unit 29 controls the PWM control unit 25 and the switching control unit 26 so that the rising timing of the PWM signal Sp1 conforms to the rising timing of the switching request signal Sch. The output timing control unit 29 corresponds to an output synchronization circuit.

In the first embodiment, when the illumination control is switched from the direct control to the computer control, the PWM signal Sp1 rises immediately after the rheostat signal Srs rises. This shortens the darkening period of the light source 3 as compared with the prior art and flickers the illumination. Thus, when the illumination control is switched from the direct control to the computer control, the output timing control unit 29 synchronizes the PWM signal Sp1 and the switching request signal Sch with the rheostat signal Srs.

Figure 6:
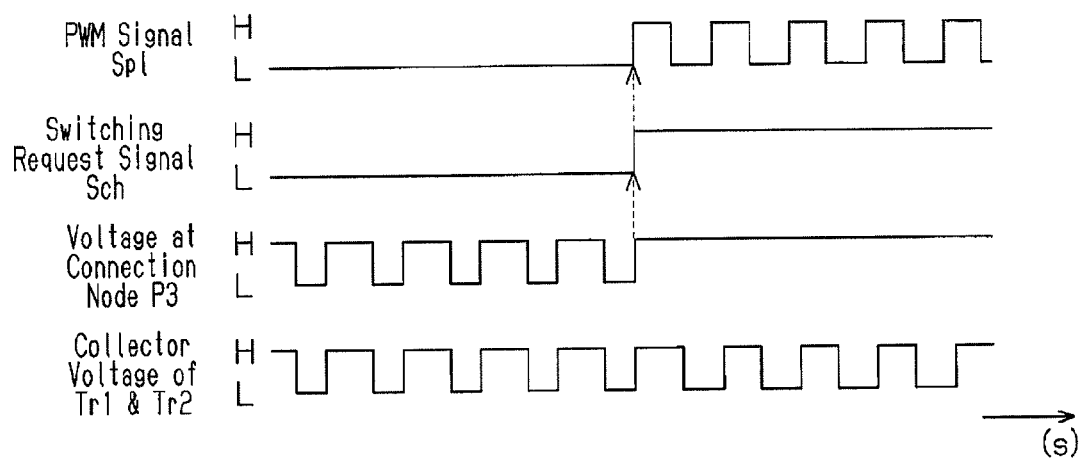
FIG. 6 is a timing chart when the output timing of the PWM signal conforms to the output timing of the switching request signal.
Figure 7:
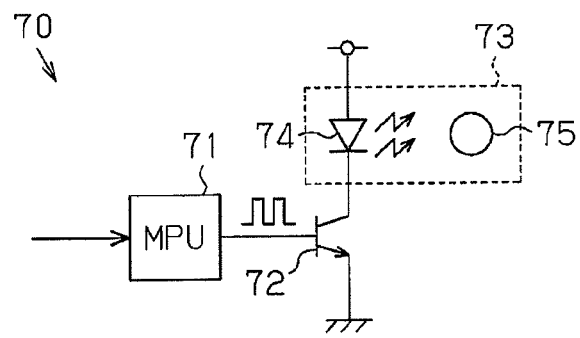
FIG. 7 is a circuit diagram of an illumination controlling circuit in the prior art.

As shown in FIG. 6, the output timing control unit 29 controls the output timing of the PWM signal Sp1 and the switching request signal Sch so that the rising timing of the PWM signal Sp1 conforms to the rising timing of the switching request signal Sch. This prevents flickering in the illumination of the light source 3 when the illumination control is switched from the direct control to the computer control.

The output timing control unit 29 also synchronizes the PWM signal Sp1 and the switching request signal Sch with the cycle of the PWM control of the rheostat signal Srs. More specifically, when the illumination control is switched from the direct control to the computer control, the output timing control unit 29 outputs the PWM signal Sp1 and the switching request signal Sch at timing determined from the cycle of the PWM control of the rheostat signal Srs to synchronize these signals with the rheostat signal Srs. This further prevents flickering in the illumination of the light source 3 when the illumination control is switched from the direct control to the computer control.

In this manner, when the illumination voltage ILL+ is supplied and the illumination control for the light source 3 is switched from the direct control to the computer control, the output timing control unit 29 synchronizes the output timing of the PWM signal Sp1 with the output timing of the switching request signal Sch. Thus, the timing at which the PWM signal Sp1 illuminates the light source 3 accurately conforms to the timing at which the connection switching circuit 7 deactivates the second transistor Tr2. This prevents flickering in the illumination of the light source 3.

In this case, the PWM signal Sp1 and the switching request signal Sch are synchronized with the rheostat signal Srs and output from the microcomputer 2a. This prevents the illumination cycle of the light source 3 from being changed drastically when the illumination control is switched from the direct control to the computer control. Thus, flickering in the illumination of the light source 3 can be prevented.

The second embodiment has the advantages described below.

(1) When the illumination voltage ILL+ is supplied and the illumination control for the light source 3 is switched from the direct control to the computer control, the output timing control unit 29 synchronizes the rising timing of the PWM signal Sp1 with the rising timing of the switching request signal Sch. Thus, timing at which current flows to the light source 3 conforms to the timing at which the connection switching circuit 7 deactivates the second transistor Tr2. This prevents flickering in the illumination of the light source 3 when the illumination control is switched from the direct control to the computer control.

(2) When the illumination control for the light source 3 is switched from the direct control to the computer control, the PWM signal Sp1 and the switching request signal Sch are output in synchronization with the rheostat signal Srs. Thus, when the illumination control for the light source 3 is switched from the direct control to the computer control, the cycles of the PWM signal Sp1, the switching request signal Sch, and the rheostat signal Srs conform to one another near the switching timing. This further restricts flickering in the illumination of the light source 3.

(3) Since the computer control is the PWM control, the brightness of the light source 3 can be easily regulated simply by switching of the duty ratios of the PWM signal Sp1, the switching request signal Sch, and the rheostat signal Srs.

(4) The voltage of the in-vehicle battery (ignition voltage IG+) is monitored, and the duty ratio of the PWM control is switched in accordance with fluctuations in the voltage of the in-vehicle battery. Thus, the brightness of the light source 3 is adjusted to be constant. Accordingly, even when the voltage of the in-vehicle battery fluctuates, the brightness of the light source 3 can be adjusted to be constant by adjusting the duty ratio of the PWM control.

(5) The rheostat signal Srs is provided to the microcomputer 2a, and the duty ratio of the PWM signal Sp1 is set in accordance with the duty ratio of the rheostat signal Srs. Thus, the brightness of the light source 3 can be adjusted to the brightness selected with the rheostat 4.

(6) The rheostat 4 is constantly supplied with power from the in-vehicle battery. Thus, the rheostat 4 is constantly operated regardless of the power supply state of the vehicle, and the vehicle indicator illumination circuit 1a can be constantly provided with the rheostat signal Srs.

(7) The vehicle indicator illumination circuit 1a includes versatile circuits mainly configured by transistors.

It should be apparent to those skilled in the art that the present invention may be embodied in many other specific forms without departing from the spirit or scope of the invention. Particularly, it should be understood that the present invention may be embodied in the following forms.

The bipolar first to fourth transistors Tr1 to Tr4 may be replaced by field-effect transistors (FETs).

In the above embodiments, as a condition for illuminating the light source 3, power is supplied to the light source 3 when the position lamp switch is turned on. However, the condition may be changed. For example, a sensor that detects the illuminance around the vehicle may be used, and the light source 3 is illuminated when the illuminance detected by the sensor becomes than a threshold value. Alternatively, the occurrence of a vehicle abnormality (such as an abnormality in any of various in-vehicle control systems) or detection of various warning signals, such as one indicating that a seatbelt is not fastened, may be the condition for illuminating the light source 3.

In the above embodiments, the illumination of the single light source 3 is controlled. However, a plurality of light sources 3 may be connected in parallel, and the light sources 3 may be simultaneously illuminated and darkened. Each of the light sources 3 is arranged in correspondence with illuminating surfaces of different switches, warning lamps, or indicators.

In the above embodiments, the rheostat 4 is operated by the power of the in-vehicle battery. However, a dedicated cell for the rheostat 4 (primary cell or rechargeable cell) may constantly be used as the power supply.

In the above embodiments, the light source 3 is illuminated when the illumination switch 6 is turned on. However, the light source 3 may be constantly illuminated. In this case, the light source 3 is constantly connected to a power supply such as a battery (B+) and not to an illumination power supply.

Instead of the rheostat 4, a power supply such as a battery may be connected to a negative terminal. In this case, when the microcomputer 2 or 2a stops operating and the third transistor Tr3 is deactivated, the power supply route to the light source 3 is switched from the first route R1 to the second route R2.

The illumination switch 6 is not limited to the position lamp switch and may be changed to another switch arranged in the vehicle.

The rheostat 4 does not have to be constantly active using the in-vehicle battery as a power supply and may be operable only when the illumination voltage ILL+ is supplied, for example.

The connection switching circuit 7 may deactivate the second transistor Tr2 when provided with an L-level switching request signal Sch and may activate the second transistor Tr2 when provided with an H-level switching request signal Sch, for example.

An external control device is not limited to the rheostat 4 as long as it can control the second transistor Tr2 from outside.

The connection switching circuit 7 is not limited to a circuit including the third transistor Tr3 and the fourth transistor Tr4 and may be changed to another circuit as long as it can validate or invalidate the direct control.

The computer control is not limited to PWM control and may be changed to another control.

The direct control is not limited to the PWM control and may be constant pulse width control, for example.

The light source 3 is not limited to the LED and may be another member such as a lamp.

The first to forth transistors Tr1 to Tr4 are not limited to bipolar transistors and may be transistors of another type or different switch members.

The on position of the ignition switch may include an accessory (ACC) on position.

The vehicle indicator illumination circuit 1 is not limited to the circuit configuration of the above embodiments and may be changed to another configuration.

When the illumination control of the light source 3 is switched from the direct control to the computer control, the vehicle indicator illumination circuit 1 does not have to perform both of the process for synchronizing the output timing of the PWM signal Sp1 with the output timing of the switching request signal Sch and the process for synchronizing the PWM signal Sp1 and the switching request signal Sch with the rheostat signal Srs. The vehicle indicator illumination circuit 1 only needs to perform at least the former process.

The present examples and embodiments are to be considered as illustrative and not restrictive, and the invention is not to be limited to the details given herein, but may be modified within the scope and equivalence of the appended claims.

The invention claimed is:

1. A vehicle indicator illumination circuit comprising:
    an indicator that indicates a vehicle state or abnormality;
    a control circuit operated by an ignition power supply, wherein the control circuit controls power that is supplied to the indicator;
    a power supply route extending to the indicator, wherein the power supply route includes a first route that closes based on the control circuit operation and a second route that opens based on the control circuit operation; and
    a connection switching circuit that receives a switching request signal from the control circuit when the control circuit stops operating, and opens the first route and closes the second route in accordance with the switching request signal to switch the power supply route extending to the indicator from the first route to the second route.

2. The vehicle indicator illumination circuit according to claim 1, wherein when the control circuit resumes operation, the power supply route extending to the indicator is automatically returned from the second route to the first route.

3. The vehicle indicator illumination circuit according to claim 1, further comprising:
    a first switching element arranged in the first route, wherein the first switching element is activated or deactivated based on the control circuit operation to open or close the first route;
    a second switching element arranged in the second route to open or close the second route;
    a signal generation circuit constantly operated by a power supply to generate an external pulse signal;
    a third switching element activated or deactivated in response to the external pulse signal, wherein the second switching element is connected to the third switching element to be activated or deactivated in accordance with the activation or deactivation of the third switching element; and
    a fourth switching element that opens or closes a connection route between the second switching element and the third switching element, wherein
        when the fourth switching element is activated, signal transmission between the second switching element and the third switching element is blocked, and when the fourth switching element is deactivated, signal transmission between the second switching element and the third switching element is allowed, and
        the fourth switching element is activated when the control circuit is operating and deactivated when the control circuit stops operating.

4. The vehicle indicator illumination circuit according to claim 3, wherein
    the signal generation circuit includes a rheostat configured to generate the external pulse signal with a pulsed shape and adjust a duty ratio of the external pulse signal through a manual operation, and
    the control circuit receives the external pulse signal from the rheostat and controls the activation and deactivation of the first switching element in accordance with the external pulse signal to adjust the brightness of the indicator.

5. The vehicle indicator illumination circuit according to claim 4, wherein the control circuit provides the first switching element with a pulse signal having a duty ratio that is the same as the external pulse signal to activate or deactivate the first switching element.

6. The vehicle indicator illumination circuit according to claim 5, wherein the illumination of the indicator is allowed when a position lamp switch is turned on.

7. The vehicle indicator illumination circuit according to claim 1, wherein when the illumination of the indicator is allowed, power is supplied to the indicator.

8. The vehicle indicator illumination circuit according to claim 1, further comprising:
    a first switch unit arranged in the first route, wherein the first switch unit opens or closes the first route in accordance with a control signal,
    wherein the control circuit includes an output synchronization circuit that synchronizes the control signal with the switching request signal when activated and provides the first switch unit with the control signal and the connection switching circuit with the switching request signal.

9. The vehicle indicator illumination circuit according to claim 8, further comprising:
    a signal generation circuit constantly operated by a power supply, wherein the signal generation circuit generates an external pulse signal that opens or closes the second route; and
    a second switch unit arranged in the second route to open or close the second route in accordance with the external pulse signal, wherein
    the control circuit includes an input circuit that acquires the external pulse signal, and
    the output synchronization circuit that receives the external pulse signal from the input circuit, synchronizes the control signal with the external pulse signal, and provides the control signal to the first switch unit.

10. The vehicle indicator illumination circuit according to claim 1, wherein the control circuit controls the power supplied to the indicator through the first route when the first route is closed, and the control circuit controls the power supplied to the indicator through the second route when the second route is closed.

11. The vehicle indicator illumination circuit according to claim 1, wherein only one of the first route and the second route is closed at a time.

12. The vehicle indicator illumination circuit according to claim 1, wherein the connection switching circuit switches a connection state of the first route and the second route when an ignition switch is switched from an on position to an off position.

13. A method for controlling a vehicle indicator illumination circuit, the method comprising:
    detecting an ignition power supply state;
    detecting a first state of a control circuit based on the ignition power supply state;
    controlling a supply of power to an indicator through a closed first power supply route among the first power supply route and a second power supply route, based on the first state of the control circuit;

receiving a switching request signal when the control circuit switches from the first state to a second state;

opening the closed first power supply route and closing the second power supply route based on the switching request signal; and controlling the supply of power to the indicator through the second power supply route among the first power supply route and the second power supply route, based on the second state of the control circuit.

14. The method according to claim 13, further comprising:

synchronizing a control signal of the control circuit for controlling the supply of power to the indicator with the switching request signal when the control circuit is in the second state; and providing the synchronized control signal through the second power supply route for controlling the supply of power to the indicator.

15. A vehicle indicator illumination circuit comprising:

an indicator that indicates a vehicle state or abnormality;

a control circuit that controls supply of power to the indicator;

an ignition power supply that supplies power to the control circuit; and a power supply route extending to the indicator, the power supply route comprising a first route and a second route that opens and closes according to a state of the control circuit, wherein the control circuit switches from a first state to a second state according to an operational state of the ignition power supply, when the control circuit is in the first state, the first route is closed and the second route is opened to control the supply of power to the indicator through the first route, and when the control circuit is in the second state, the first route is opened and the second route is closed to control the supply of power to the indicator through the second route.

* * * * *